(12) United States Patent
Kim

(10) Patent No.: US 9,644,305 B2
(45) Date of Patent: May 9, 2017

(54) DRIVE MOTOR FOR DRUM WASHING MACHINE

(71) Applicant: AMOTECH CO., LTD., Incheon (KR)

(72) Inventor: Byung Soo Kim, Anyang-si (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 14/809,578

(22) Filed: Jul. 27, 2015

(65) Prior Publication Data

US 2015/0330011 A1 Nov. 19, 2015

Related U.S. Application Data

(62) Division of application No. PCT/KR2014/000781, filed on Jan. 28, 2014.

(30) Foreign Application Priority Data

Jan. 28, 2013 (KR) .................. 10-2013-0009292

(51) Int. Cl.
*H02P 27/04* (2016.01)
*D06F 37/30* (2006.01)
(Continued)

(52) U.S. Cl.
CPC .......... *D06F 37/304* (2013.01); *D06F 37/206* (2013.01); *D06F 37/30* (2013.01); *H02K 1/148* (2013.01); *H02K 16/00* (2013.01); *H02K 16/02* (2013.01); *H02K 21/12* (2013.01); *H02K 3/28* (2013.01); *H02K 15/0442* (2013.01); *H02K 21/16* (2013.01); *H02K 21/22* (2013.01)

(58) Field of Classification Search
CPC .................... H02K 1/22; H02K 1/27

USPC ......................... 318/797, 800, 801
See application file for complete search history.

(56) References Cited

U.S. PATENT DOCUMENTS 6,257,027 B1 * 7/2001 Imai .................. D06F 37/304
68/12.12
7,557,486 B2 * 7/2009 Choi .................. D06F 37/304
310/154.33
(Continued)

FOREIGN PATENT DOCUMENTS

JP 06312085 11/1994
JP 3524376 2/2004
(Continued)

OTHER PUBLICATIONS

International Searh Report—PCT/KR2014/000781 dated May 7, 2014.

*Primary Examiner* — Rina Duda
(74) *Attorney, Agent, or Firm* — Cantor Colburn LLP

(57) ABSTRACT

A drive motor includes: a double stator including a stator core, a first coil wound on one side of the stator core, and a second coil wound around the other side of the stator core; and a double rotor including a rotor support connected to a drum via a rotating shaft, an outer rotor fixed to the rotor support and arranged with a gap on the outer surface of the stator, and an inner rotor fixed to the rotor support and arranged with a gap on the inner surface of the stator. The drive motor drives to rotate two rotors of the double rotor by applying a drive power to the first and second coils at wash and rinsing strokes, and drives to rotate only one rotor of the double rotor by applying the drive power to only one of the first and second coils at a dehydration stroke.

8 Claims, 10 Drawing Sheets

(51) Int. Cl.
*H02K 16/02* (2006.01)
*D06F 37/20* (2006.01)
*H02K 21/12* (2006.01)
*H02K 1/14* (2006.01)
*H02K 16/00* (2006.01)
*H02K 21/22* (2006.01)
*H02K 3/28* (2006.01)
*H02K 21/16* (2006.01)
*H02K 15/04* (2006.01)

(56) References Cited

U.S. PATENT DOCUMENTS

| | | | | |
|---|---|---|---|---|
| 7,777,386 B2* | 8/2010 | Horst | ............... | H02K 1/146 310/156.01 |
| 8,220,295 B2* | 7/2012 | Choi | ............... | D06F 37/206 68/12.16 |
| 2009/0064727 A1* | 3/2009 | Choi | ............... | D06F 37/206 68/140 |
| 2014/0091662 A1* | 4/2014 | Kim | ............... | H02K 7/14 310/114 |

FOREIGN PATENT DOCUMENTS

| | | |
|---|---|---|
| JP | 2011083396 | 4/2011 |
| KR | 1019980063959 | 10/1998 |
| KR | 1020060088238 | 8/2006 |
| KR | 1020070066093 | 6/2007 |
| KR | 101063528 | 9/2011 |
| KR | 1020120136081 | 12/2012 |

\* cited by examiner

DRIVE MOTOR FOR DRUM WASHING MACHINE

CROSS REFERENCE TO RELATED APPLICATIONS

This application is a divisional of International Application No. PCT/KR2014/000781, filed on Jan. 28, 2014, which claims priority to and the benefit of Korean Application No. 10-2013-0009292 filed on Jan. 28, 2013, in the Korean Patent Office, the entire contents of which are incorporated herein by reference.

TECHNICAL FIELD

The present invention relates to a drive motor for a drum washing machine, a drum washing machine having the same, and a method of driving the drum washing machine.

BACKGROUND ART

As disclosed in Korean Patent Publication No. 10-1063528 on 1 Sep. 2011, a conventional drum washing machine includes: a tub that is rotatably disposed in the inside of a case; and a motor that is disposed in the rear of the tub and whose rotating shaft passes through the rear center of the tub to then be connected to a drum, in which the motor includes a bearing housing that is fixed to the tub and for rotatably supporting the rotating shaft, a stator fixed to the bearing housing, and a rotor arranged at a predetermined gap on the outer circumferential surface of the stator and connected to the rotating shaft.

Such a conventional drum washing machine is configured so that when power is applied to the stator, the rotor rotates and the drum is connected to the rotor via the rotating shaft also rotates, to thus perform washing, rinsing, and dewatering strokes to wash laundry.

Generally, the number of slots provided in stator cores (that is, the number of teeth) in a motor for a washing machine is set in proportion to the number of poles (that is, the number of N-poles and S-poles) therein. When the number of slots increases, the washing machine motor exhibits high-torque and low-speed characteristics. Reversely, when the number of slots decreases, the washing machine motor exhibits low-torque and high-speed characteristics.

Meanwhile, the operation modes of the washing machine may be classified into a washing mode, a rinsing mode and a dehydration mode, that is, a spin mode.

The washing mode (hereinafter referred to as including the rinsing mode) requires a low speed (RPM) and high torque, and the dehydration mode (or the spin mode) requires a high speed and a low torque. That is, it is desirable to have the more number of slots at the washing mode in the washing machine motor, but it is desirable to have the less number of slots at the spin mode therein.

However, since the washing mode and the spin mode require opposite characteristics to each other, it is difficult to design the stator to have a structure, that is, the number of slots, to satisfy all of the requirements of the washing mode and the spin mode.

Therefore, a typical washing machine motor is designed to fit in the low speed and high torque in a washing mode, by using a concentrative winding method of winding coils around teeth provided in stator cores, but has caused the efficiency to be lowered when performing the spin mode. In addition, the operating time for the washing mode of the washing machine is very longer than the operating time for the spin mode thereof.

Therefore, the washing machine motor is designed to have the more number of the stator slots to be suitable for typically a washing mode, and to be optimized for the high-torque and low-speed characteristics for the washing mode, and to perform a control of weakening a magnetic field at the spin mode the low-torque and high-speed characteristics.

However, the above-mentioned magnetic field weakening control requires a very complex control circuit and control routine, and may cause a problem that cannot maximize the drive efficiency of the motor for washing machines.

Since driving efficiency of the motor for washing machines cannot be optimized in terms of the overall design in the case of designing a washing machine motor in consideration of only any one of the washing mode and the spin mode as described above, it is a common practice to design the washing machine motor to operate at an intermediate stage by considering a torque value of the washing machine motor required in the washing mode and a rotation speed of the washing machine motor required in the spin mode. As a result, there is a problem that the motor for washing machines cannot be designed to have a structure with the maximum efficiency at the washing mode or spin mode.

Considering it is difficult to increase the efficiency of the washing machine motor due to the above-described motor structure, Korean Patent Application Publication No. 10-2007-0066093 disclosed the optimal efficiency of the washing machine by using a motor drive method.

That is, the conventional motor drive method of the drum washing machine disclosed in the Korean Patent Application Publication No. 10-2007-0066093 is configured to include the steps of: determining whether operation information of the drum washing machine is a normal mode or a high speed mode when the drum washing machine starts to operate; and reading out square wave motor drive information at the normal mode, and applying the square wave motor drive information to the drum washing machine motor, and reading out sinusoidal wave motor drive information at the high speed mode, and applying the sinusoidal wave motor drive information to the drum washing machine motor.

Accordingly, the conventional drum washing machine was designed to improve the efficiency by applying the square wave motor drive method to the motor at the wash and rinsing modes requiring the low speed and high torque characteristics, and applying the sinusoidal wave motor drive method to the motor at the hydration mode requiring the high speed and low torque characteristics, but confronted a limit to the improvement in efficiency of the motor with no structural improvement of the motor.

In addition, alternatively, a direct and parallel drive method can be applied for controlling the motor for washing machines. The direct and parallel drive method is configured to employ a method of aligning stator coils as a direct drive method at the washing stroke, to thus increase the torque of the motor, and as a parallel drive method at the dehydration stroke, to thus increase the speed of the motor. However, in order to drive the stator coils in one of the direct and parallel drive methods according to the kind of the operation mode such as the wash and dehydration mode, a lot of switching elements are needed and a lot of peripheral circuits are added to increase the number of the circuits, to thereby increase the cost.

In addition, in the case of designing a stator to have a multi-slot structure to increase the motor efficiency at the time of a washing stroke, the coil winding volume increases and thus a back electromotive force (Back EMF) value is greatly increased. In this case, the motor can increase the speed up to the back EMF value becomes the direct-current (DC) power voltage. Thus, the motor of the multi-slot structure may have the difficulty in securing the dehydrating voltage margin at the time of the dehydration mode requiring the high speed.

Meanwhile, in general, in the case of using a motor with a single stator as a drive apparatus for a drum washing machine, if the motor is designed as a structure suitable for only any one of the washing stroke and the dehydration stroke, the problem of lowering the efficiency of the motor at the other stroke cannot be fundamentally solved, since the rotational speeds and torques of the motor required in the washing stroke differ from those of the dehydration stroke. However, the inventors have found that the motor can be designed with the possible best efficiency at both the washing stroke and the dehydration stroke in the case of using a motor of the double-stator and double-rotor structure.

SUMMARY OF THE INVENTION

To solve the above problems or defects, it is an object of the present invention to provide a drive motor for a drum washing machine and a drum washing machine having the same, in which a motor of a double-stator and double-rotor structure is used and driven as the drive motor so that an inner rotor and an outer rotor can rotate separately, to thereby simultaneously drive an inner stator and an outer stator during performing wash and rinsing strokes to thus rotate the inner rotor and the outer rotor, and to thereby drive any one of the inner stator and the outer stator to thus rotate any one of the inner rotor and the outer rotor, during performing a dehydration stroke, and to accordingly design an optimal torque and rotating speed that is suitable for the wash and dehydration strokes to thus increase the washing efficiency and the motor efficiency.

It is another object of the present invention to provide a method of driving a drum washing machine in which a single inverter is used as a drive motor of a double-stator and double-rotor structure, to thus control a drum of the drum washing machine to have an optimal torque according to wash and dehydration strokes.

The objects of the present invention are not limited to the above-described objects, and other objects and advantages of the present invention can be appreciated by the following description and will be understood more clearly by those of ordinary skill in the art from embodiments of the present invention.

To accomplish the above and other objects of the present invention, according to an aspect of the present invention, there is provided a drive motor for a drum washing machine, the drive motor comprising: a stator including a stator core fixed to a tub, a first coil wound on one side of the stator core, and a second coil wound around the other side of the stator core; a rotor including a rotor support that is connected to a drum via a rotating shaft, an outer rotor fixed to the rotor support and arranged with a gap on the outer surface of the stator, to thus be rotated by interacting with a first coil, and an inner rotor fixed to the rotor support and arranged with a gap on the inner surface of the stator, to thus be rotated by interacting with a second coil; and a motor drive circuit that controls an alternating-current (AC) power to be applied to the first and second coils at a washing mode, for driving both the inner and outer rotors simultaneously, and that controls the AC power to be applied to any one of the first and second coils at a dehydration mode, for driving any one of the inner and outer rotors.

Preferably but not necessarily, the stator core comprises a plurality of split cores, in which each of the split cores comprises: an outer tooth on which the first coil is wound; an inner tooth that is formed in opposition to the outer tooth and on which the second coil is wound; a partitioning portion to partition between the outer tooth and the inner tooth; and connecting portions that are formed at both end portions of the partitioning portion and connecting between the split cores.

Preferably but not necessarily, the connecting portions comprise a coupling projection that is formed on one side of the partitioning portion and a coupling recess that is formed on the other side of the partitioning portion in which the coupling projection is fitted with the coupling recess.

Preferably but not necessarily, the stator further comprises a fixing bracket for fixing the stator core to the rear surface of the tub, the stator core has a throughhole formed in the center thereof, and a bolt passes through to the throughhole to then be coupled into an engagement hole formed in the fixing bracket.

Preferably but not necessarily, the stator further comprises a fixing bracket for fixing the stator core to the rear surface of the tub, in which the fixing bracket is integrally formed with the stator core by an insert molding process.

Preferably but not necessarily, the outer peripheral portion of the fixing bracket is formed to extend to be fixed to the back surface of the tub.

Preferably but not necessarily, the first coil is sequentially wound on the outer teeth of the plurality of split cores and the second coil is sequentially wound on the inner teeth of the plurality of split cores.

Preferably but not necessarily, the motor drive circuit comprises: an inverter for applying a three-phase alternating-current power to the first and second coils; and a switch that applies or blocks the three-phase alternating-current power to any one of first and second coils.

Preferably but not necessarily, the motor drive circuit comprises: an inverter for applying a three-phase alternating-current power to the first and second coils; a first switch that applies or blocks the three-phase alternating-current power to the first coil; and a second switch that applies or blocks the three-phase alternating-current power to the second coil.

According to another aspect of the present invention, there is also provided a drum washing machine, the drum washing machine comprising: a tub that is suspended and supported in the inside of a case and contains washing water; a drum that is rotatably supported in the inside of the tub and that contains laundry; and a drive motor that is disposed in the rear of the tub and that is connected to the drum via a rotating shaft, wherein the drive motor comprises: a stator including a stator core fixed to a tub, a first coil wound on one side of the stator core, and a second coil wound around the other side of the stator core; a rotor including a rotor support that is connected to a drum via a rotating shaft, an outer rotor fixed to the rotor support and arranged with a gap on the outer surface of the stator, to thus be rotated by interacting with a first coil, and an inner rotor fixed to the rotor support and arranged with a gap on the inner surface of the stator, to thus be rotated by interacting with a second coil; and a motor drive circuit that controls an alternating-current (AC) power to be applied to the first and second coils at a washing mode, for driving both the inner and outer rotors simultaneously, and that controls the AC power to be applied to any one of the first and second coils at a dehydration mode, for driving any one of the inner and outer rotors.

Preferably but not necessarily, the stator further comprises a fixing bracket for fixing the stator core to the rear surface of the tub, the stator core has a throughhole formed in the center thereof, and a bolt passes through to the throughhole to then be coupled into an engagement hole formed in the fixing bracket.

Preferably but not necessarily, the stator further comprises a fixing bracket for fixing the stator core to the rear surface of the tub, wherein the fixing bracket is integrally formed with the stator core by an insert molding process.

According to another aspect of the present invention, there is also provided a method of driving a drum washing machine including a double rotor having an inner rotor and an outer rotor that are connected to a drum via a rotating shaft in which the drum is rotatably supported in the tub and a double stator having stator cores in which a first coil and a second coils are respectively wound on a plurality of inner teeth and a plurality of outer teeth corresponding to the inner rotor and the outer rotor, the driving method comprising the steps of: determining an operation mode of the drum washing machine; generating a rotational force to the outer rotor and the inner rotor by applying a three-phase alternating-current power to the first coil and the second coil when the operation mode is a washing mode; and generating the rotational force to only one of the outer rotor and the inner rotor by applying the three-phase alternating-current power to only one of the first coil and the second coil when the operation mode is a dehydration mode.

As described above, the drive device for the drum washing machine according to the present invention includes a drive motor of a double-stator and double-rotor structure so that an inner rotor and an outer stator each are separately driven to rotate in which the drive motor is designed to have optimal efficiency appropriate for wash and rinsing strokes.

That is, a first coil is wound on outer teeth of stator cores constituting the double-stator and a second coil is wound on inner teeth of the stator cores, so that an inner rotor and an outer rotor each are separately driven to rotate by an alternating-current power applied to the first coil and the second coil, to thus form the drive motor of the double-stator and double-rotor structure.

When using the drive motor of the double-stator and double-rotor structure, a motor drive circuit drives an inner stator and an outer stator simultaneously at the wash and rinsing strokes, to thus drive the inner rotor and the outer rotor to rotate simultaneously to thereby implement a high-torque design appropriate for the wash and rinsing strokes and to thus increase the washing efficiency and the motor efficiency.

Further, since it is possible to reduce the number of stator slots to the one half in which the stator is operated when any one of the inner stator and the outer stator is driven at the time of the dehydration stroke, a dehydration voltage margin may be easily secured at the dehydration stroke requiring a high speed (RPM), to thereby implement a high-speed design appropriate for the dehydration strokes and to thus increase the dehydration efficiency and the motor efficiency.

As a result, since it is possible to reduce the number of stator slots to the one half depending upon selection of one of the wash and dehydrating modes according to the present invention, a drive motor for a drum washing machine may be employed to have a plurality of stator cores having a plurality of stator slots without burdening the rotational speed of the motor to increase at the dehydration mode, to thus heighten a design freedom.

Therefore, according to the present invention, the drive motor for the drum washing machine is configured to adopt the motor structure with the optimal washing efficiency in the washing mode, and to easily reach a target high-speed rotation speed without the use of a magnetic field weakening control that requires a complicated control circuit and control routine in the dehydration mode.

Furthermore, according to the present invention, a method of driving a drum washing machine is implemented to control a drum of the drum washing machine to have an optimal torque according to the wash and dehydration strokes, by employing a single inverter in the drive motor of the double-stator and double-rotor structure, to thus simplify the circuit configuration.

DETAILED DESCRIPTION OF THE INVENTION

Figure 1:
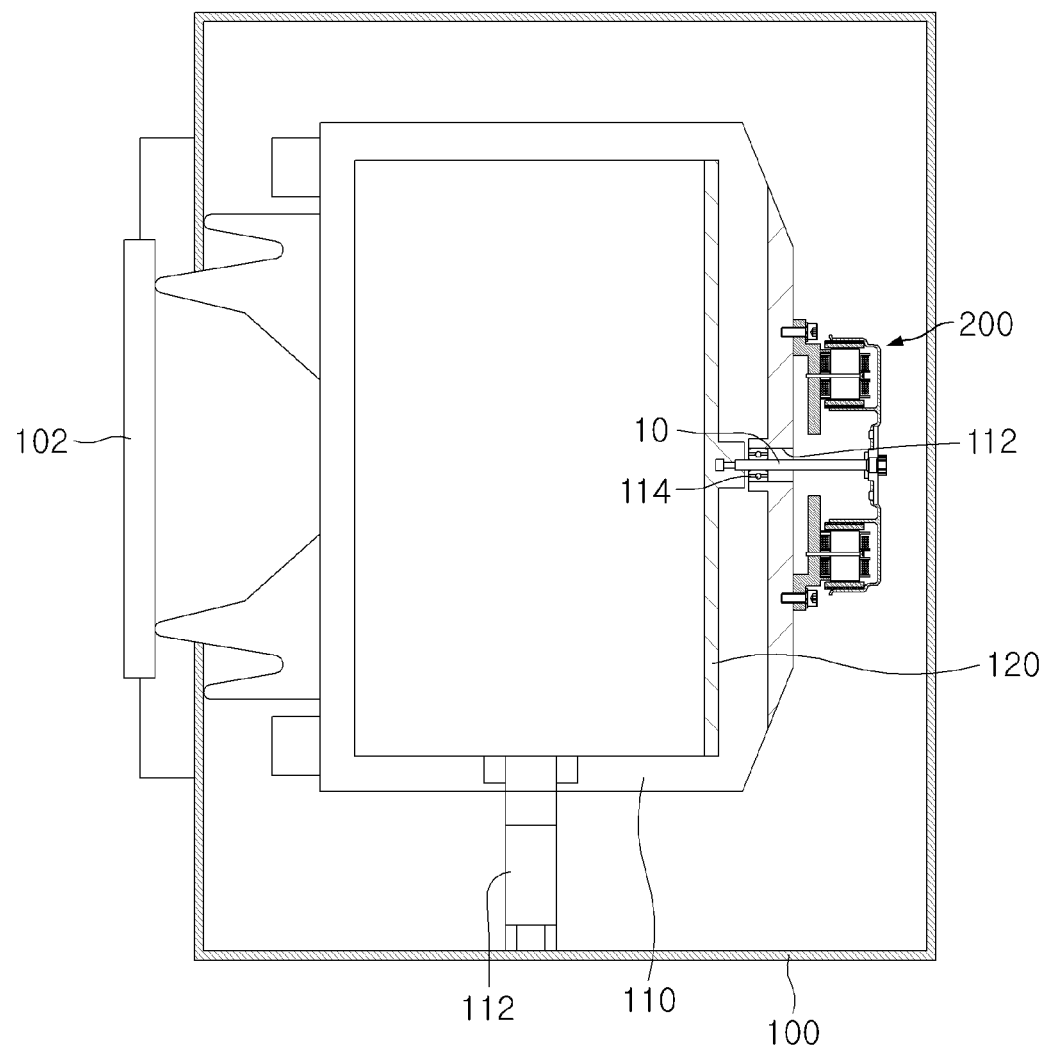
FIG. 1 is an axial cross-sectional view of a drum washing machine according to a first embodiment of the present invention.

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention the specifically defined terms may be changed according to user's or operator's intention, or the custom. Definitions of these terms herein need to be made based on the contents across the whole application.

Figure 2:
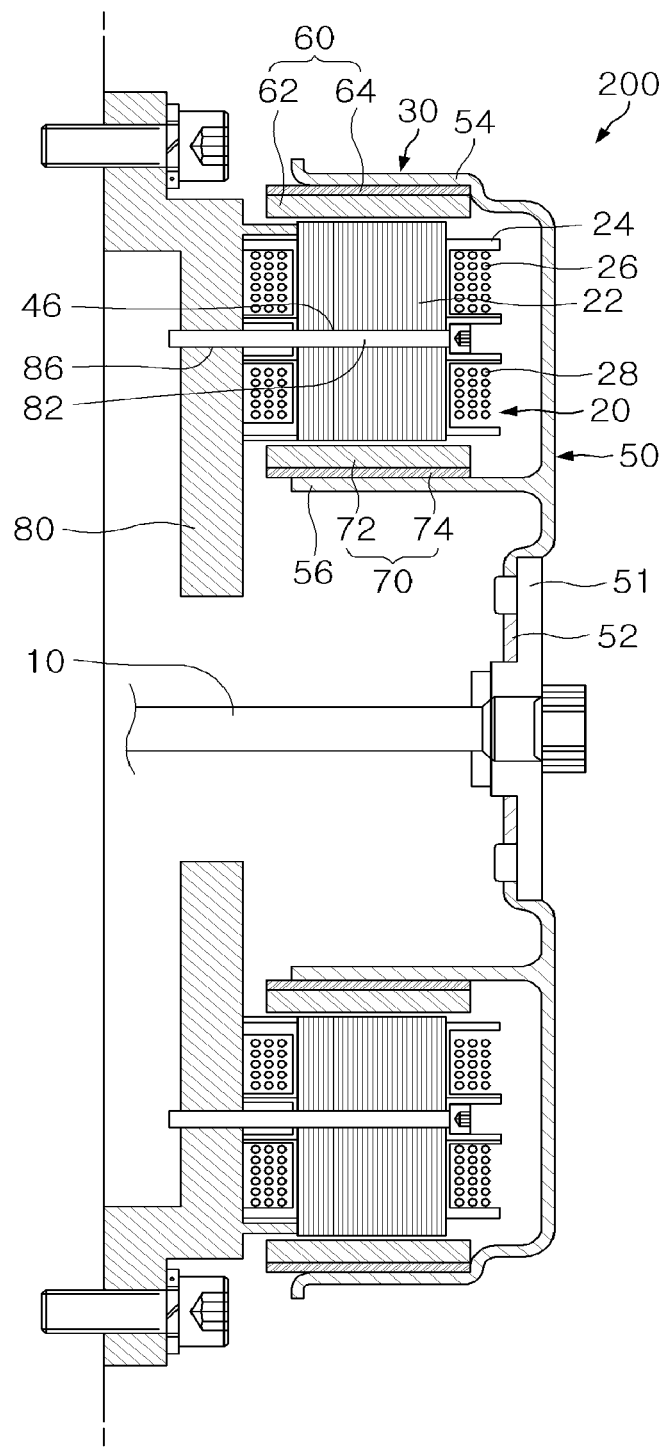
FIG. 2 is an axial cross-sectional view of a drive motor according to the first embodiment of the present invention.
Figure 3:
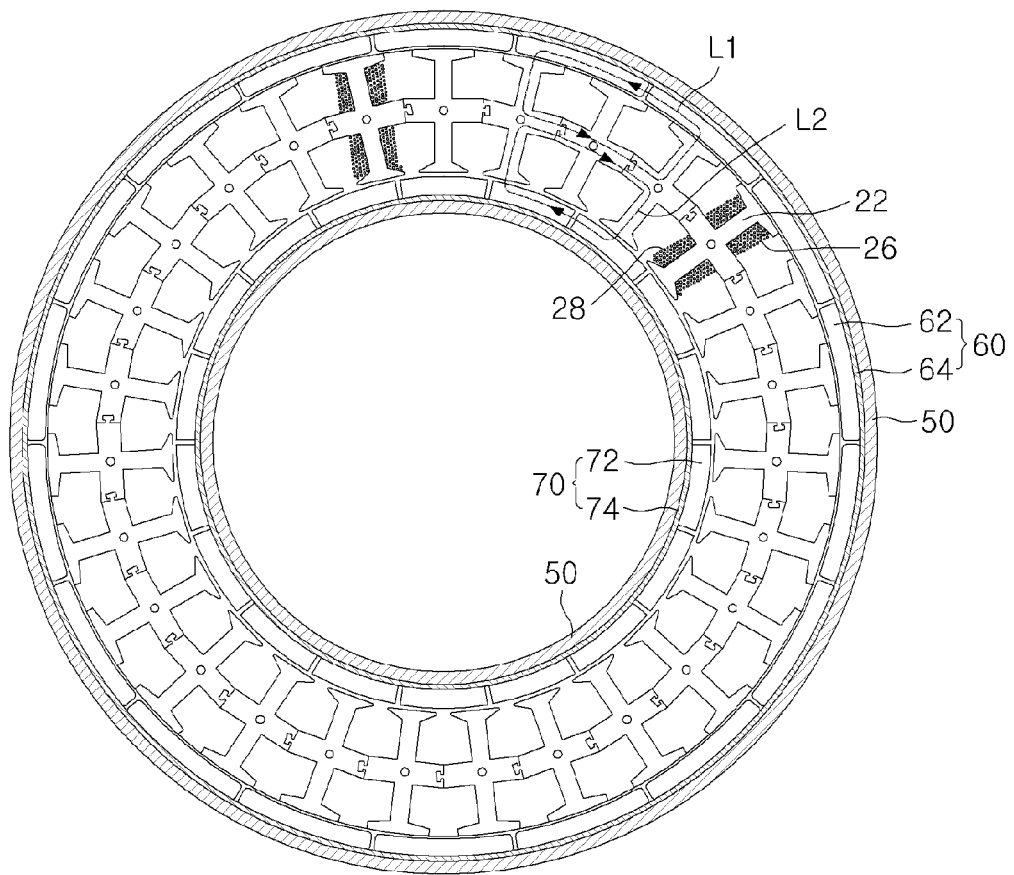
FIG. 3 is a diametrical cross-sectional view of the drive motor according to the first embodiment of the present invention.

FIG. 1 is a cross-sectional view of a drum washing machine according to a first embodiment of the present invention. FIG. 2 is an axial cross-sectional view of a drive motor according to the first embodiment of the present invention. FIG. 3 is a diametrical cross-sectional view of the drive motor according to the first embodiment of the present invention.

Referring to FIGS. 1 and 2, a drum washing machine according to the first embodiment of the present invention includes: a case 100 on one side of which a cover 102 is mounted so that the cover 102 can be opened and closed; a tub 110 that is suspended and supported by a damper 112 inside the case 100 and for accommodating washing water; a drum 120 that is rotatably supported inside the tub 110 and for accommodating laundry; and a drive motor 200 that is mounted at the center of the back surface of the tub 110 and is connected to the drum 120 via a rotating shaft 10 to thus drive the drum 120.

The drive motor 200 include: a stator 20 which is secured to the bottom of the tub 110; and a rotor 30 that is arranged with a certain gap on the outer peripheral surface and inner peripheral surface of the stator 20 and is coupled to the rotating shaft 10.

The rotating shaft 10 passes through a throughhole 112 that is formed to pass through the tub 110 and a bearing 114 for rotatably supporting the rotating shaft 10 is fitted on the inner surface of the throughhole 112.

One end of the rotating shaft 10 is fixed to the rear surface of the drum 120, and the other end thereof is fixed to a rotor support 50 for supporting the rotor 30 by a method such as a spline-coupling method.

The rotor 30 includes: the rotor supporter 50 that is spline-coupled to the rotating shaft 10 through a bushing 51; an outer rotor 60 mounted on the outside of the rotor support 50 and disposed with a certain gap from the outer surface of the stator 20; and an inner rotor 70 mounted inside the rotor support 50 and disposed with a certain gap from the inner surface of the stator 20.

The rotor support 50 includes: a rotating shaft fixing portion 52 that is formed in a disc shape, and is provided with a bushing 51 fixed to the rotating shaft 10 in the center of the rotating shaft fixing portion 52; an outer rotor fixing portion 54 that extends from the edge of the rotating shaft fixing portion 52, and to which the outer rotor 60 is fixed; and an inner rotor fixing portion 56 that extends from the rotating shaft fixing portion 52, is disposed with a certain gap from the inner surface of the outer rotor fixing portion 54, and to which the inner rotor 70 is fixed.

The rotor support 50 is formed integrally by insert molding, after arranging the outer rotor 60 and the inner rotor 70 in a mold in the form of an annular shape, or is made of an electronic steel sheet to act as a back yoke, in which a first magnet 62 of the outer rotor 60 and a second magnet 72 of the inner rotor 70 may be fixed to the rotor support 50 with an adhesive.

The outer rotor 60 includes: a first magnet 62 disposed with a certain gap on the outer surface of the stator 20; and a first back yoke 64 that is mounted on the back surface of the first magnet 62.

The inner rotor 70 includes: a second magnet 72 disposed with a certain gap on the inner surface of the stator 20; and a second back yoke 74 that is mounted on the back surface of the second magnet 72.

Figure 4:
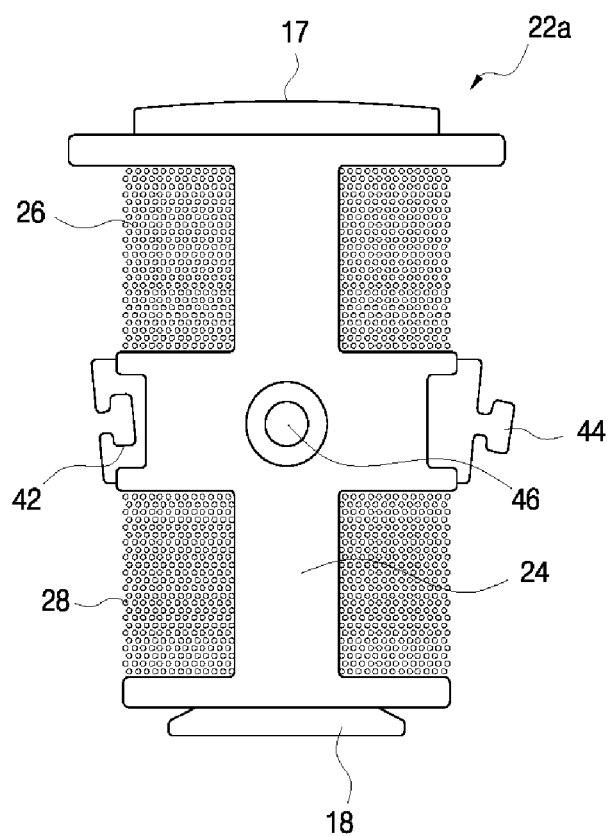
FIG. 4 is a cross-sectional view of a split core assembly according to the first embodiment of the present invention.
Figure 5:
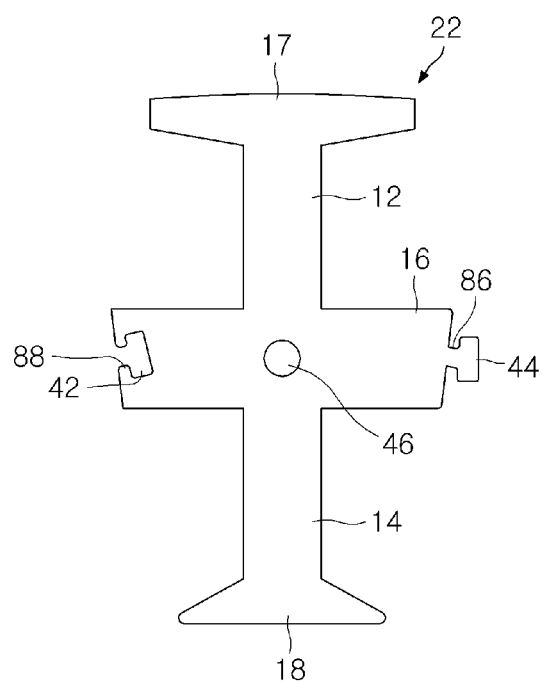
FIG. 5 is a plan view of a split core according to an embodiment of the present invention.

FIG. 4 is a cross-sectional view of a split core assembly according to the first embodiment of the present invention. FIG. 5 is a plan view of a split core according to an embodiment of the present invention.

The stator 20 is made of a plurality of split core assemblies 22a that are arranged in an annular form, and each of the split core assemblies 22a includes: a split core 22; a bobbin 24 made of a non-magnetic material and that is wrapped on the outer peripheral surface of the split core 22; a first coil 26 wound on one side of the split core 22; a second coil 28 wound on the other side of the split core 22; and a fixing bracket 80 for fixing the split core on the rear surface of the tub 110. In this case, the central portion of the fixing bracket 80 is open and may easily discharge heat generated from the stator 20 and the rotor 30 externally.

Figure 11:
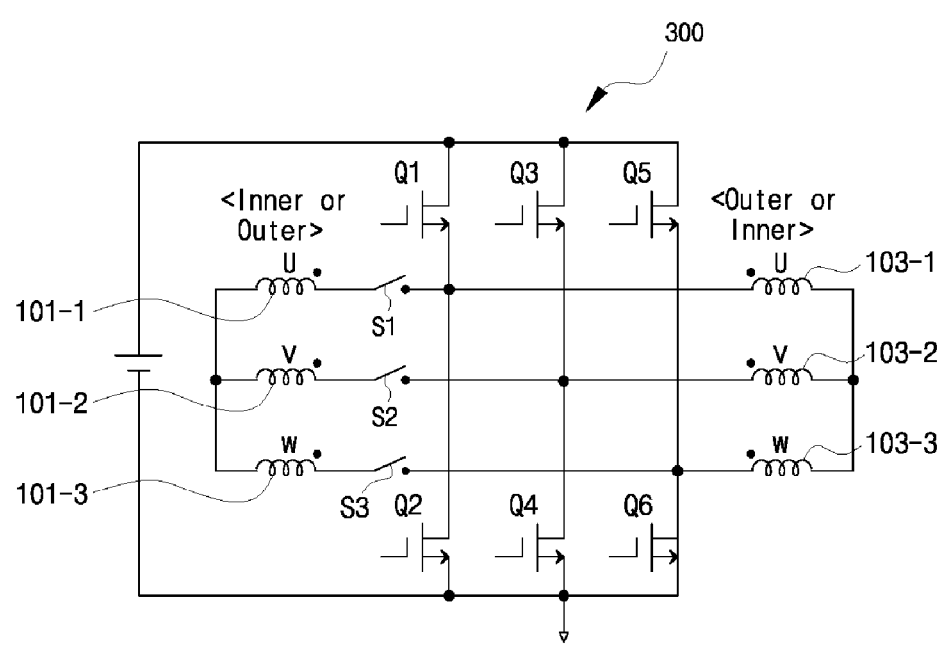
FIG. 11 is a circuit diagram showing a motor drive circuit for driving the drive motor according to an embodiment of the present invention.

Here, the three-phase alternating-current (AC) power is applied to the first coil 26 and the second coil 28 through an inverter of a motor drive circuit shown in FIG. 11. When the AC power is applied only to the first coil 26, only the outer rotor 60 generates the rotational force. In addition, when the AC power is applied only to the second coil 28, only the inner rotor 70 generates the rotational force. In addition, when the AC power is applied to both the first coil 26 and the second coil 28, the outer rotor 60 and the inner rotor 70 generate the rotational forces simultaneously.

The split core 22 includes: an outer tooth 12 on which the first coil 26 is wound; an inner tooth that is formed in opposition to the outer tooth 12 and on which the second coil 28 is wound; a partitioning portion 16 for partitioning between the outer tooth 12 and the inner tooth 14; and connecting portions 42 and 44 that are formed on either side of the partitioning portion 16 and that interconnect between the adjacent split cores 22. The partitioning portion 16 and the connecting portions 42 and 44 play a role of a back yoke that forms a magnetic circuit.

At the end of the outer tooth 12 is formed a first extension portion 17 that is disposed to face the first magnet 62, and at the end of the inner tooth 14 is formed a second extension portion 18 that is disposed to face the second magnet 72.

The first extension portion 17 and the second extension portion 18 form inwardly and outwardly curved surfaces at predetermined curvatures to correspond to the first magnet 62 of the outer rotor 60 and the second magnet 72 of the inner rotor 70, respectively. Thus, since the roundness of each of the inner and outer peripheral portions of the split core 22 is high, the gaps between the inner periphery and the outer periphery of the stator 20 and the first magnet 62 and the second magnet 72 get closer, to thus maintain a constant magnetic gap.

Then, the split core 22 is formed of a plurality of laminated iron plates. At the center of the split core 22 is formed a throughhole 46 through which a bolt 82 passes in order to secure the plurality of iron plates.

Here, the bolt 82 passes through the throughhole 46, and is fastened to a fastening hole 85 formed in the fixing bracket 80, to thereby secure the split core 22 to the fixing bracket 80.

That is, a plurality of iron plates are fastened by the single bolt 82 and the split core 22 is fixed to the fixing bracket 80 as well by the single bolt 82, thereby reducing the assembly process and the number of parts.

Figure 6:
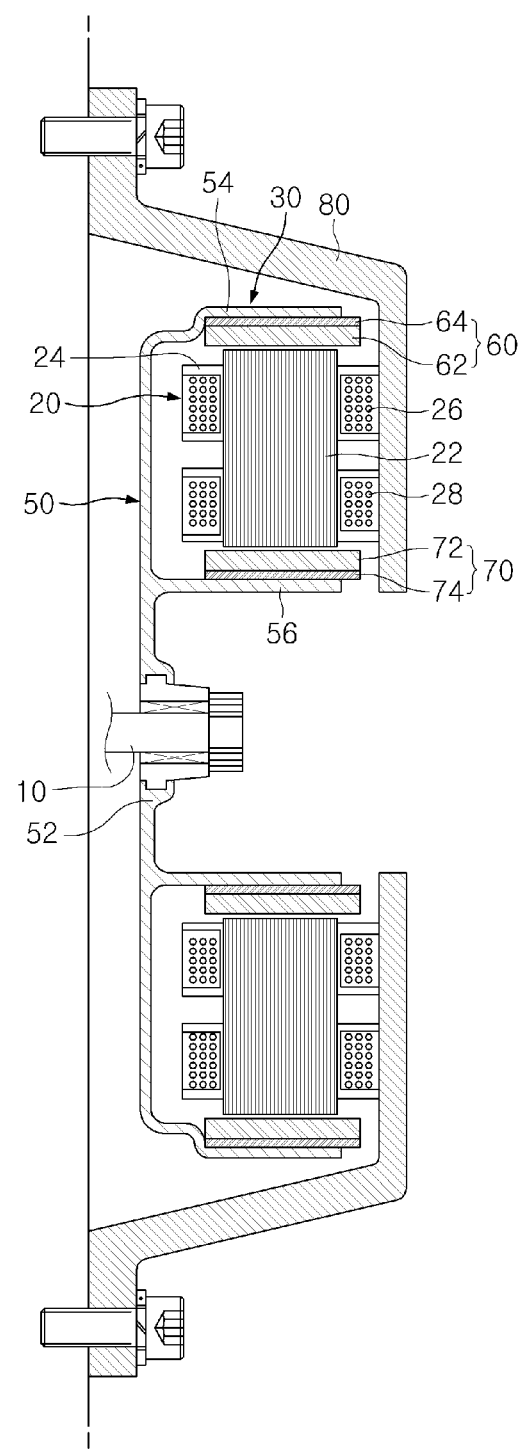
FIG. 6 is an axial cross-sectional view of a drive motor according to a second embodiment of the present invention.

In addition to the structure that the plurality of split cores 22 and the fixing bracket 80 are fastened by the bolt 82, as described in the first embodiment, the coupling structure between the plurality of split cores 22 and the fixing bracket 80 may be integrally formed by insert molding as in the second embodiment. That is, according to the second embodiment shown in FIG. 6, a plurality of split cores 22 are radially arranged in a mold and then the fixing bracket 80 is integrally formed with the split cores 22 by insert molding. The fixing bracket 80 integrally formed with the stator 20 is mounted on the rear surface of the tub 110 by using a bolt.

The split cores 22 are directly connected to each other to have a structure so as to form a magnetic circuit. Thus, the connecting portions 42 and 44 have a structure of allowing the split cores 22 to be directly connected to each other and to be energized therebetween.

As an example, these connecting portions 42 and 44 include a coupling projection 44 protrudingly formed at one side of a partitioning portion 16, and a coupling groove 42 formed at the other side of the partitioning portion 16 and fitted with another coupling projection 44 formed at one side of an adjacent partitioning portion 16. A narrowed neck portion 86 is formed in one coupling projection 44 and is engaged with an inlet 88 of the coupling groove 42 of an adjacent partitioning portion 16.

Figure 7:
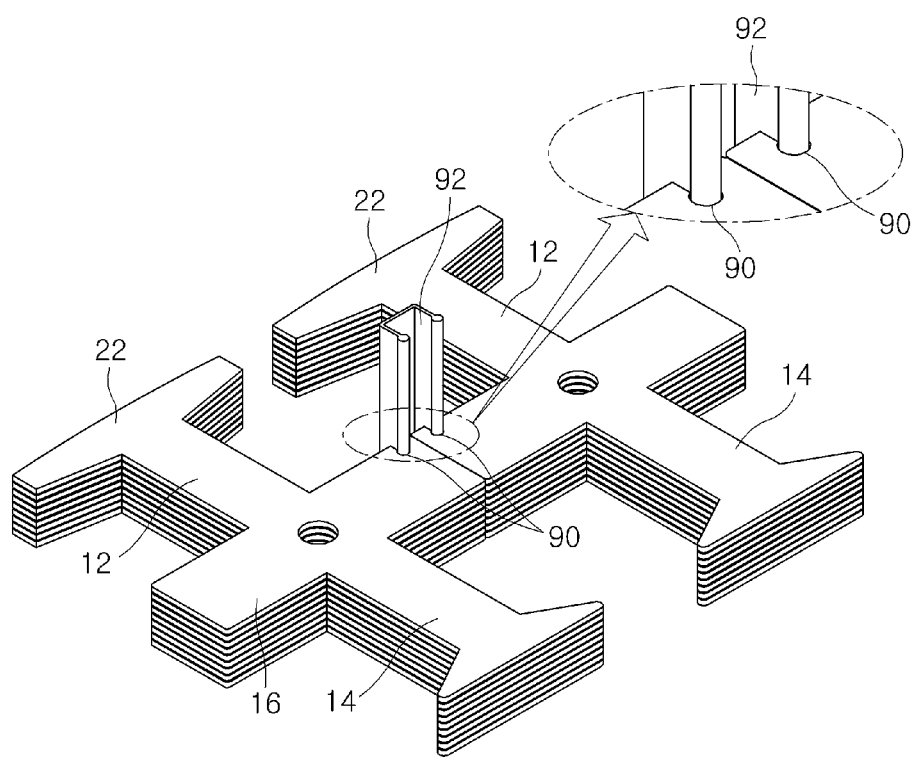
FIG. 7 is a perspective view of a split core connecting portion according to another embodiment of the present invention.
Figure 8:
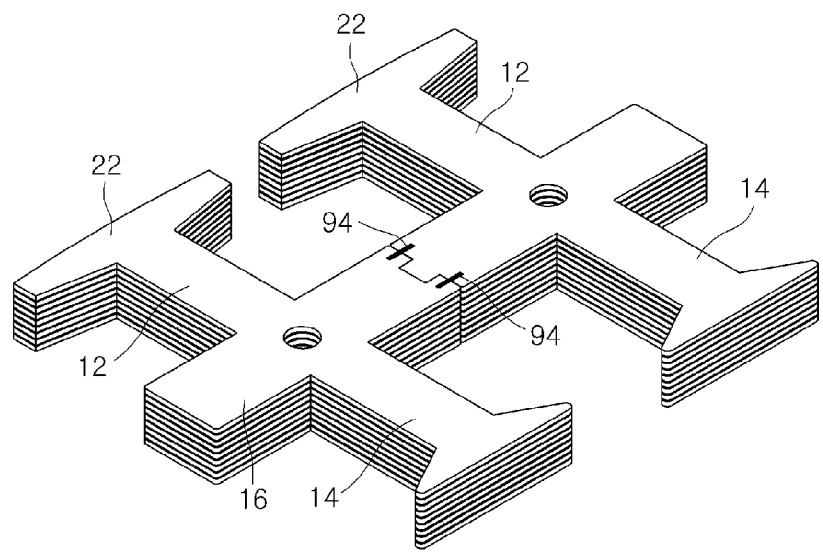
FIG. 8 is a perspective view of a split core connecting portion according to still another embodiment of the present invention.

Further, in addition to such a structure of the connecting portions, the connecting portions are also configured to have another structure that pin holes 90 are formed at both sides of the partitioning portion 16 of the split core 22 in which pin members 92 are fitted between the pin holes 90 of two adjacent split cores 22 at a state where the two adjacent split cores 22 are in contact with each other, to thereby connect between the two adjacent split cores 22, as shown in FIG. 7. Meanwhile, as shown in FIG. 8, two adjacent split cores 22 are caulked by using a caulking member at a state where the two adjacent split cores 22 are in contact with each other, to thereby connect between the two adjacent split cores 22.

The bobbin 24 is formed to be wrapped around the outer peripheral surface of the remaining core except for the first extension portion 17 and the second extension portion 18 in a manner that the first extension portion 17 and the second extension portion 18 are exposed to interact with the first magnet 62 and the second magnet 72. That is, the bobbin 24 is formed on the outer circumference of the split core 22 by insert molding, and insulates between the split core 22, and each of the first coil 26 and the second coil 28.

As shown in FIG. 3, the drive motor 200 forms a first magnetic circuit L1 between the outer rotor 60 and one side of the stator 20 on which the first coil 26 is wound, and forms a second magnetic circuit L2 between the inner rotor 70 and the other side of the stator 20 on which the second coil 28 is wound, to thereby form a pair of magnetic circuits that are independent to each other, to thus shorten a magnetic path and thereby reducing the magnetic resistance, reducing the magnetic losses and improving the motor efficiency.

Specifically, the first magnetic circuit L1 is formed by passing through the N-pole of the first magnet 62, the outer tooth 12 on which the first coil 26 is wound, the outer portion of the partitioning portion 16, the adjacent outer tooth 12, the S-pole of the first magnet 62 adjacent to the N-pole of the first magnet 62, and the first back yoke 64.

In addition, the second magnetic circuit L2 is formed by passing through the N-pole of the second magnet 72, the inner tooth 14 opposite to the N-pole of the second magnet 72 and on which the second coil 28 is wound, the inner portion of the partitioning portion 16, the adjacent inner tooth 14, the S-pole of the second magnet 72 and the second back yoke 74.

In this way, a process of manufacturing the stator that is configured as described above will be described below according to an embodiment of the present invention.

Figure 9:
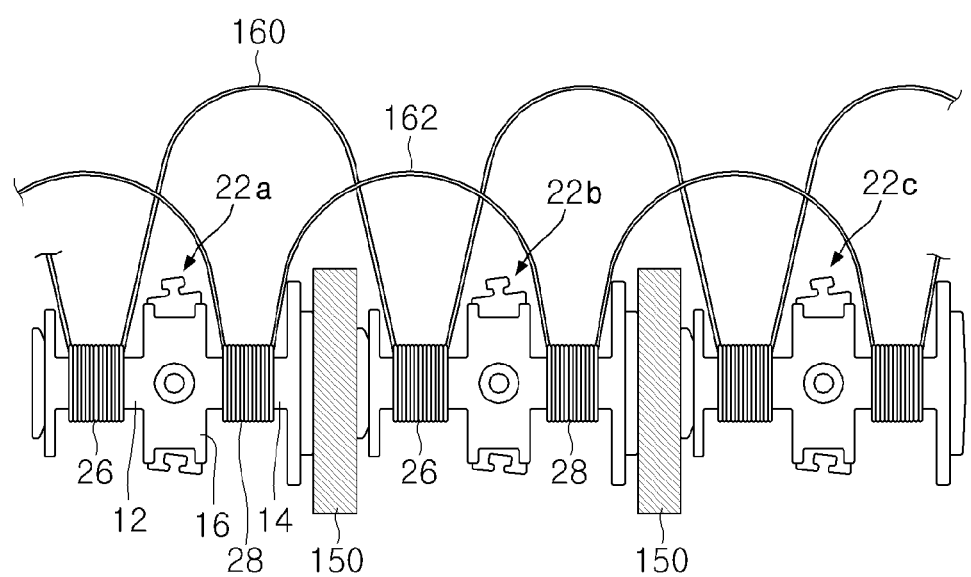
FIG. 9 is a schematic view for explaining a method of winding coils on split cores according to an embodiment of the present invention.
Figure 10:
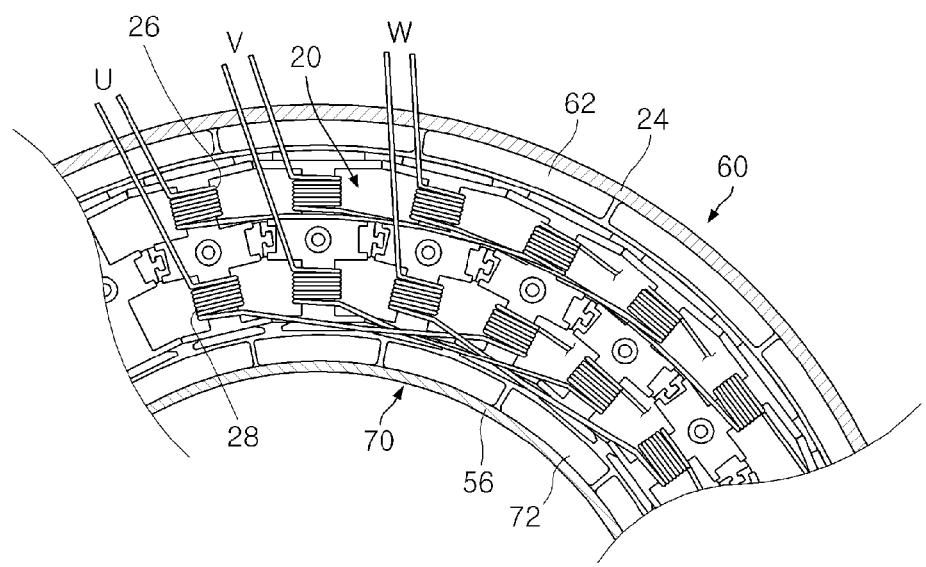
FIG. 10 is a schematic view for explaining a method of assembling split core assemblies according to an embodiment of the present invention.

FIG. 9 is a schematic view for explaining a method of winding coils on split cores according to an embodiment of the present invention. FIG. 10 is a schematic view for explaining a method of assembling split core assemblies according to an embodiment of the present invention.

First, each of the split cores 22 is formed by laminating a plurality of iron plates and then undergoing insert molding so that the bobbin 24 is wrapped around the outer circumferential surface of each of the split cores 22.

Then, a coil winding process is undergone so that the first coil 26 is wound on the outer tooth 12 of each of the split cores 22 and the second coil 28 is wound on the inner tooth 14 thereof.

Looking at the coil winding process, the split cores 22 are aligned in a line. In other words, the outer teeth 12 and the inner teeth 14 are horizontally aligned in a line, and the split cores 62 are fixed such that the gaps between the split cores 22 are horizontally arranged by using a core alignment jig 150. Here, it is preferable to use a magnet jig on both sides of which each of the split cores 22 is attached as the core alignment jig 150 so that the gaps between the split cores 22 are secured by using a magnetic force.

When the split cores 22 are completely aligned, the first coil 26 is wound on the outer circumferential surface of the outer tooth 12 and simultaneously the second coil 28 is wound on the outer circumferential surface of the inner tooth 14, by using a continuous winding apparatus. Here, two different coils are each individually on the outer tooth 12 and the inner tooth 14, as the first coil 26 and the second coil 28, respectively.

Here, each of the split cores 22 is partitioned into the outer tooth 12 and the inner tooth 14, by a partitioning portion 16, and thus the first coil 26 wound on the outer tooth 12 and the second coil 28 wound on the inner tooth 14 may be wound in a separated form from each other.

In addition, when the windings of one split core 22 are completed, the windings of a neighboring split core 22 are performed subsequently one after another in a continuous coil winding method. That is, the first coil 26 is wound on the outer circumferential surface of the outer tooth 12 of each of the split cores 22 and simultaneously the second coil 28 is wound on the outer circumferential surface of the inner tooth 14 thereof. Here, since a clearance is somewhat secured between the split cores 22 when the split cores 22 are aligned radially, a first jump wire 160 is connected between one first coil 26 and a neighboring first coil 26, and a second jump wire 162 is connected between one second coil 28 and a neighboring second coil 28.

Coils are continuously wound on the plurality of the split cores 22, by repeating the above process. In the case of a three-phase system, three sets of split core assemblies 22a-22c corresponding to each of U, V, and W phases are assembled.

As described above, since the second coil 28 is simultaneously wound on the outer circumferential surface of the inner tooth 14 of each of the split cores 22 when the first coil 26 is wound on the outer circumferential surface of the outer tooth 14 thereof, in the case of the coil winding method according to the present embodiment, the first coil 26 and the second coil 28 are simultaneously wound, to thereby improve productivity and shorten a manufacturing time.

That is, when the step of winding the first coil 26 on the outer peripheral surface of the outer tooth 12 and the step of winding the second coil 28 on the outer peripheral surface of the inner tooth 14 are separately performed, the coil winding process should be performed twice, but, in this embodiment, the first coil 26 and the second coil 28 are wound simultaneously in a single coil winding process, to thus save coil winding time and improve productivity.

When the manufacture of the split core assemblies 22a-22c is completed, in the above manufacturing process as shown in FIG. 9, split core assemblies 22a-22c of the respective U, V, and W phases are alternately arranged in turn for each phase. In this case, since the jump wires 162 and 164 are connected for the respective phases between the split cores 22, gaps which may be formed between the split core assemblies when the three-phase split core assemblies 22a-22c are alternately arranged may be counter-measured sufficiently.

The plurality of the split core assemblies 22a-22c are radially arranged and then are coupled with the fixing bracket 80 with the bolt 82 as shown in FIG. 2, to thereby complete assembly of the stator.

Here, the bolt 82 passes through throughholes 46 formed in the split cores 22 and is coupled to the fastening hole 85 of the fixing bracket 80, to thereby simplify the assembly process. Then, after the split cores 22 are radially arranged in a mold, it is possible to form the fixing bracket 80 into one body by insert injection.

The operation of the drive motor of the drum washing machine according to the embodiments of the present invention will be described on the following.

FIG. 11 is a circuit diagram showing a motor drive circuit for driving a drive motor for a drum washing machine according to an embodiment of the present invention.

The first coil 26 of three phases includes first three-phase stator coils 101-1, 101-2, and 101-3, and the second coil 28 of three phases includes second three-phase stator coils 103-1, 103-2, and 103-3.

When the three-phase alternating-current power supplied from the inverter 300 is applied to the first three-phase stator coils 101-1, 101-2, and 101-3, a rotating force is generated to rotate the outer rotor 60, and when the three-phase alternating-current power supplied from the inverter 300 is applied to the second three-phase stator coils 103-1, 103-2, and 103-3, a rotating force is generated to rotate the inner rotor 70.

In this case, it is possible to configure the first three-phase stator coils 101-1, 101-2, and 101-3 to generate a rotational force to rotate the inner rotor 70, and the second three-phase stator coils 103-1, 103-2, and 103-3 to generate a rotating force to rotate the outer rotor 60.

The inverter 300 includes three pairs of switching devices (Q1, Q2), (Q3, Q4) and (Q5, Q6) that perform switching operations of DC power of an electric power source Vcc, depending on the three-phase PWM drive signal that is amplified to have a sufficient voltage level by a gate driver. The three pairs of switching devices (Q1, Q2), (Q3, Q4) and (Q5, Q6) are divided into upper switching devices Q1, Q3, and Q5 and lower switching devices Q2, Q4, and Q6 and are respectively connected in a totem pole structure.

In addition, the three-phase (U-phase, V-phase and W-phase) AC power is generated at the junction of each of the three pairs of the switching devices (Q1, Q2), (Q3, Q4) and (Q5, Q6), and the generated three-phase AC power is output to the first three-phase stator coils 101-1, 101-2, and 101-3 and the second three-phase stator coils 103-1, 103-2, and 103-3.

First power switches S1, S2, and S3 are provided along the first three-phase stator coils 101-1, 101-2, and 101-3, respectively, in order to apply or cut off the three-phase AC power. Further, as needed, second switches may be provided along the second three-phase stator coils 103-1, 103-2, and 103-3, respectively, in order to apply or cut off the three-phase AC power.

When the first three-phase stator coils 101-1, 101-2, and 101-3 generates the rotational force, i.e., torque, to rotate the outer rotor 60, the first switches S1, S2, and S3 serve to turn on and off the drive of the outer rotor 60. In addition, when the first three-phase stator coils 101-1, 101-2, and 101-3 generates the rotational force, i.e., torque, to rotate the inner rotor 70, the first switches S1, S2, and S3 serve to turn on and off the drive of the inner rotor 70.

In the motor drive circuit shown in FIG. 11, the case that the switches S1, S2, and S3 that turn on and off the three-phase AC power supplied from the inverter 300 are provided only at any one of the first coil 26 and the second coil 28 has been described. However, first switches and second switches are provided at both the first coil 26 and the second coil 28, in order to turn on and off the three-phase AC power supplied from the inverter 300, and then the first switches and the second switches are selectively controlled depending upon the wash and dehydration modes, to thereby drive the first coil 26 and the second coil 28 selectively or simultaneously.

The operation of the drive motor will be described with reference to the motor drive circuit of FIG. 11. When a motor control unit (not shown) sets the first switches S1, S2, and S3 to be turned on, during a washing stroke, the three-phase AC power supplied from the inverter 300 is applied to the first three-phase stator coils 101-1, 101-2, and 101-3 and the second three-phase stator coils 103-1, 103-2, and 103-3, to thus generate rotational forces to rotate the outer rotor 60 and the inner rotor 70.

Thus, it is possible to rotate the drum in the speed and torque appropriate for the washing stroke to thus improve the washing efficiency.

Then, the first switches S1, S2, and S3 are turned off at the dehydration stroke, and thus the three-phase AC power supplied from the inverter 300 is applied to only the second three-phase stator coils 103-1, 103-2, and 103-3, to thereby generate a rotational force to rotate only the inner rotor 70.

Accordingly, only one rotational force is generated to rotate only one of the outer rotor 60 and inner rotor 70, at the dehydration stroke, to thus increase the speed and improve the dehydration efficiency.

In the above-described embodiment, the case that the stator cores on which the first and second coils 26 and 28 are wound are configured by assembling a plurality of split cores 22 has been described, but the present invention is not limited thereto. In some embodiments, it is also possible to apply an integral stator core, as shown in FIG. 12.

Figure 12:
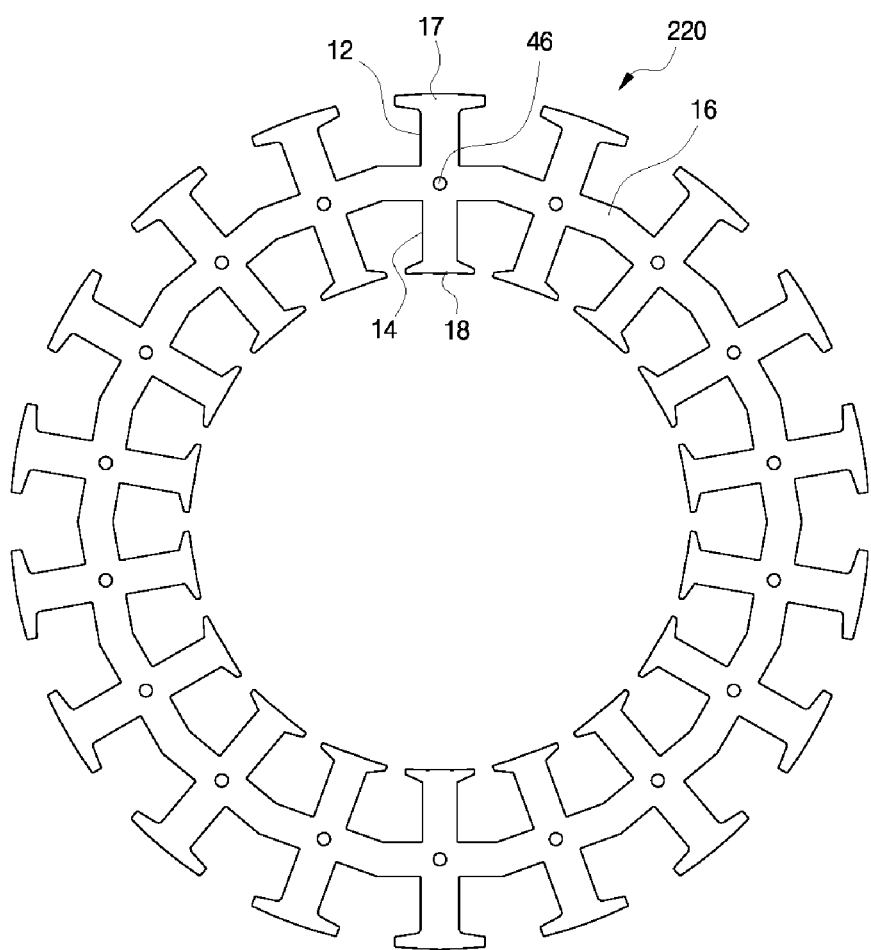
FIG. 12 is a plan view showing stator cores according to another embodiment of the present invention.

Referring to FIG. 12, an integral stator core 220 includes: a plurality of outer teeth 12 and inner teeth 14 that are extended radially to the outside and the inside of an annular back yoke 16 forming a magnetic circuit path. The first and second coils 26 and 28 are respectively wound on the outer teeth 12 and inner teeth 14, to constitute a double stator.

In FIG. 12, a reference numeral 46 indicates throughholes for fixing the stator cores 220 to the fixing brackets 80 with bolts.

As described above, the drive device for the drum washing machine according to the present invention employs a motor of a double-stator and double-rotor structure so that an inner rotor and an outer rotor can rotate separately, to thus exhibit optimal efficiency in the wash and rinsing strokes.

That is, when the stator core constitutes the double stator, the first coil is wound on the outer teeth of the stator core and the second coil is wound on the inner teeth of the stator core, and the inner rotor and the outer rotor are separately driven by an alternating-current power applied to the first and second coils, respectively, to thereby implement a motor of a double-stator and double-rotor structure.

When using such a motor of a double-stator and double-rotor structure as the drive motor of the drum washing machine, the motor drive circuit drives the inner stator and the outer stator simultaneously at the washing and rinsing strokes, to thus drive the inner rotor and the outer rotor to rotate simultaneously, to thereby implement a high-torque design appropriate for the washing and rinsing strokes and increase the washing efficiency and the motor efficiency.

Further, since it is possible to reduce the number of stator slots to the one half in which the stator is operated when any one of the inner stator and the outer stator is driven at the time of the dehydration stroke, a dehydration voltage margin may be easily secured at the dehydration stroke requiring a high speed (RPM), to thereby implement a high-speed design appropriate for the dehydration strokes and to thus increase the dehydration efficiency and the motor efficiency.

As a result, since it is possible to reduce the number of stator slots to the one half depending upon selection of one of the wash and dehydrating modes according to the present invention, a drive motor for a drum washing machine may be employed to have a plurality of stator cores having a plurality of stator slots without burdening the rotational speed of the motor to increase at the dehydration mode, to thus heighten a design freedom.

Therefore, according to the present invention, the drive motor for the drum washing machine is configured to adopt the motor structure with the optimal washing efficiency in the washing mode, and to easily reach a target high-speed rotation speed without the use of a magnetic field weakening control that requires a complicated control circuit and control routine in the dehydration mode.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention may be applied to a drive motor and a drum washing machine including the same, in which the drive motor is configured to drive only any one of the inner rotor and the outer rotor during performing a dehydration stroke, and drive both the inner rotor and the outer rotor simultaneously during performing washing and rinsing strokes, to thereby enable a torque design appropriate for the washing, rinsing and dehydration strokes, and increase the dehydration efficiency and the motor efficiency.

What is claimed are:

1. A drive motor for a drum washing machine, the drive motor comprising:
   a stator including a stator core fixed to a tub and the stator core comprising a plurality of split cores arranged in an annular form, wherein each of the split cores comprises an outer tooth, an inner tooth formed in opposition to the outer tooth, a partitioning portion formed between the outer tooth and the inner tooth, and connecting portions formed at both end portions of the partitioning portion and connecting two neighboring split cores in such a way that the split cores form the annular form, and wherein a first coil is wound around the outer tooth, and a second coil is wound around the inner tooth, the first coil and the second coil being separated from each other;
   a rotor including a rotor support that is connected to a drum via a rotating shaft, an outer rotor fixed to the rotor support and arranged with a gap on an outer surface of the stator, to thus be rotated by interacting with the first coil, and an inner rotor fixed to the rotor support and arranged with a gap on an inner surface of the stator, to thus be rotated by interacting with the second coil; and
   a motor drive circuit configured to control an alternating-current (AC) power to be applied to both the first and second coils at a washing mode, for driving both the inner and outer rotors simultaneously, and to control the AC power to be applied to any one of the first and second coils at a dehydration mode, for driving any one of the inner and outer rotors.

2. The drive motor according to claim 1, wherein the connecting portions comprise a coupling projection that is formed on one side of the partitioning portion and a coupling recess that is formed on the other side of the partitioning portion in which the coupling projection is fitted with the coupling recess of a neighboring split core.

3. The drive motor according to claim 1, wherein the stator further comprises a fixing bracket for fixing the stator core to a rear surface of the tub, the split cores have a throughhole formed in a center thereof, and a bolt passes through to the throughhole to then be coupled into an engagement hole formed in the fixing bracket.

4. The drive motor according to claim 1, wherein the stator further comprises a fixing bracket for fixing the stator core to a rear surface of the tub, wherein the fixing bracket is integrally formed with the stator core by an insert molding process.

5. The drive motor according to claim 4, wherein an outer peripheral portion of the fixing bracket is formed to extend to be fixed to a back surface of the tub.

6. The drive motor according to claim 1, wherein the first coil is sequentially wound on the outer teeth of the plurality of split cores and the second coil is sequentially wound on the inner teeth of the plurality of split cores.

7. The drive motor according to claim 1, wherein the motor drive circuit comprises:
   an inverter for applying a three-phase AC power to the first and second coils; and
   a switch that applies or blocks the three-phase AC power to any one of the first and second coils.

8. The drive motor according to claim 1, wherein the motor drive circuit comprises:
   an inverter for applying a three-phase AC power to the first and second coils;
   a first switch that applies or blocks the three-phase AC power to the first coil; and
   a second switch that applies or blocks the three-phase AC power to the second coil.

* * * * *